United States Patent [19]

Lumley

[11] Patent Number: 5,722,720
[45] Date of Patent: Mar. 3, 1998

[54] CHILD SAFETY SEAT WITH AN ANTI-REBOUND SUPPORT

[75] Inventor: Michael Andrew Lumley, Sunshine, Australia

[73] Assignee: Britax Child-Care Products Pty Ltd., Victoria, Australia

[21] Appl. No.: 666,893

[22] Filed: Jun. 13, 1996

[30] Foreign Application Priority Data

Jun. 29, 1995 [AU] Australia .................... PN3865

[51] Int. Cl.$^6$ .................................... B60N 2/28
[52] U.S. Cl. .................... 297/216.11; 297/256.14
[58] Field of Search .............. 297/216.1, 216.11, 297/256.1, 256.14, 250.1

[56] References Cited

U.S. PATENT DOCUMENTS

| 4,186,962 | 2/1980 | Meeker . | |
|---|---|---|---|
| 4,456,302 | 6/1984 | Knoedler et al. | 297/216.11 X |
| 4,480,870 | 11/1984 | von Wimmersperg | 297/216.11 |
| 4,613,188 | 9/1986 | Tsuge et al. | 297/256.14 X |
| 4,743,064 | 5/1988 | Takizawa | 297/216.11 X |
| 5,052,749 | 10/1991 | Groenendijk | 297/256.14 X |
| 5,106,154 | 4/1992 | Kain . | |

FOREIGN PATENT DOCUMENTS

| 27956/77 | 2/1979 | Australia . |
|---|---|---|
| 0 317 438 A1 | 5/1989 | European Pat. Off. . |
| 0 371524 | 6/1990 | European Pat. Off. . |
| 9 202 146-8 | 1/1994 | Sweden . |
| 2 270 834 | 3/1994 | United Kingdom . |

Primary Examiner—Peter R. Brown
Attorney, Agent, or Firm—Davis and Bujold

[57] ABSTRACT

This invention relates to a child safety seat 10 for use in a vehicle seat 18. The child safety seat 10 has an anti-rebound protection. The safety seat 10 comprises a seat and back rest portion 11 and 12 for seating an infant, at least one base member 19 on the safety seat 10 that supports it when placed on a surface such as a vehicle seat and an anti-rebound support 20 attached to the safety seat 10 so that when the safety seat 10 is used in a rearward direction on a vehicle seat 18 the anti-rebound support 20 is moved to a first position where it extends above the seat portion 12 of the child safety seat 10 and abuts against the backrest of the vehicle seat 18 thereby restraining rebound movement. The anti-rebound support 20 is movable to a second position where it is stowed beneath the safety seat 10 so that it is clear of the base member 19 and any surface that the base member 19 is resting on. The advantage of the invention is that the anti-rebound support 20 is fully stowed or retracted under the safety seat 10 when not in use.

15 Claims, 4 Drawing Sheets

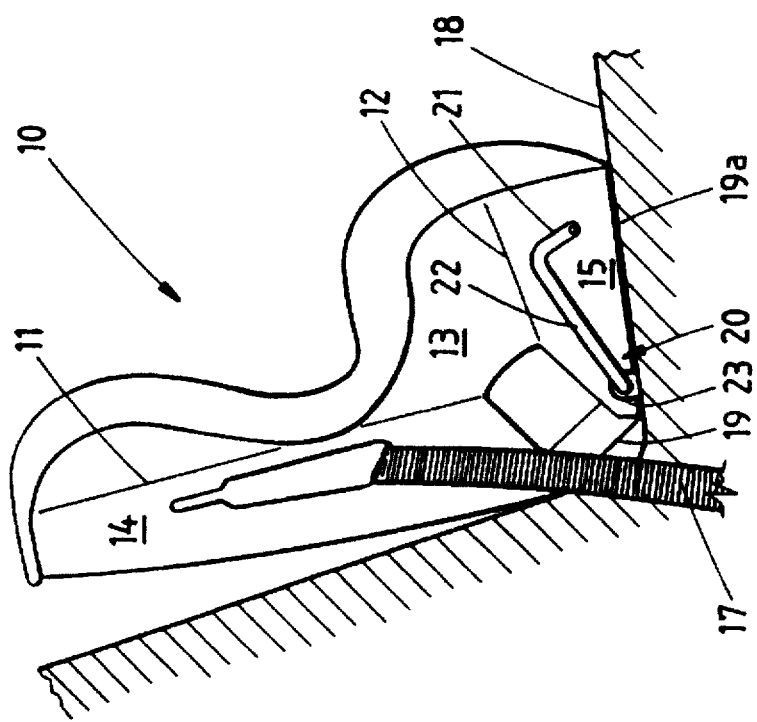
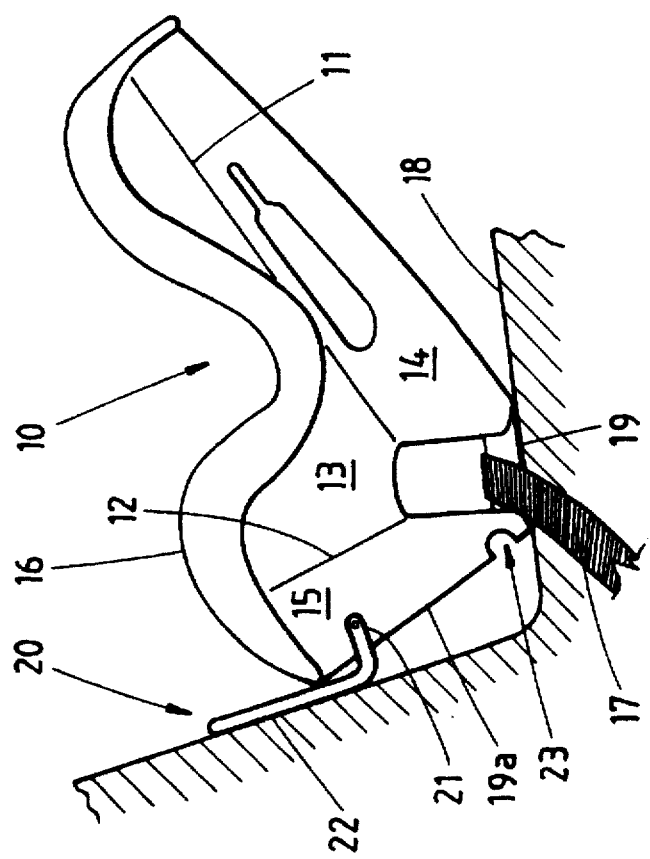

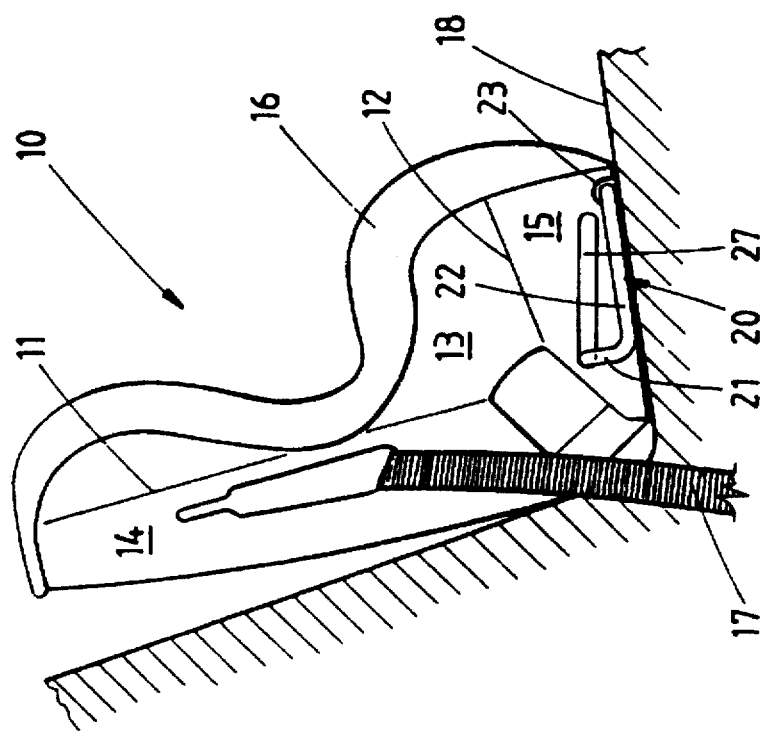
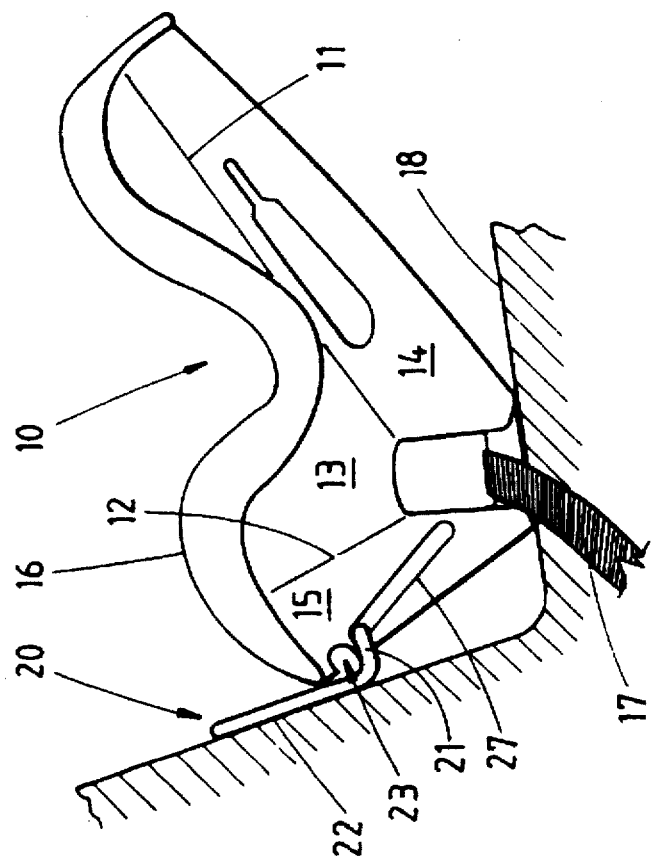

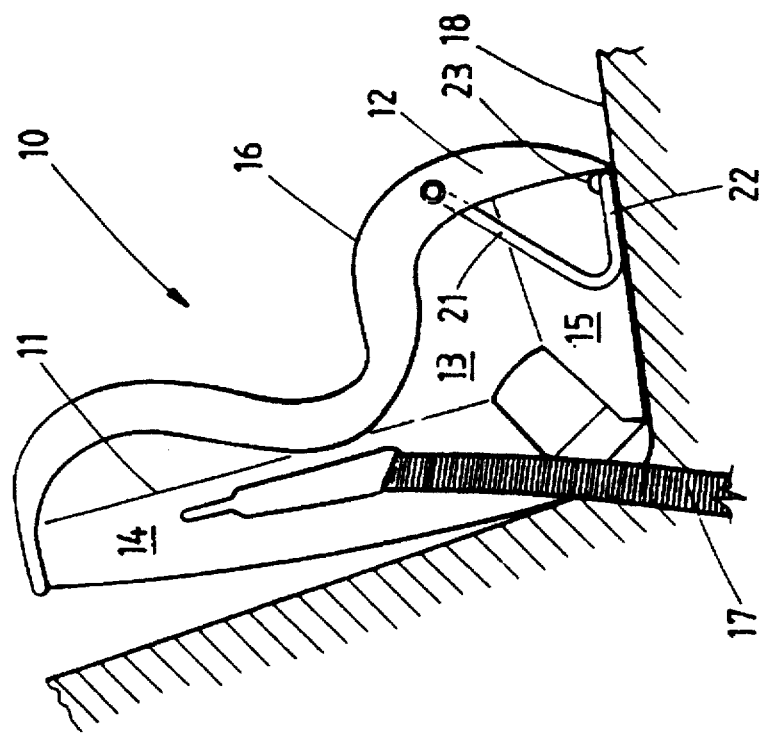
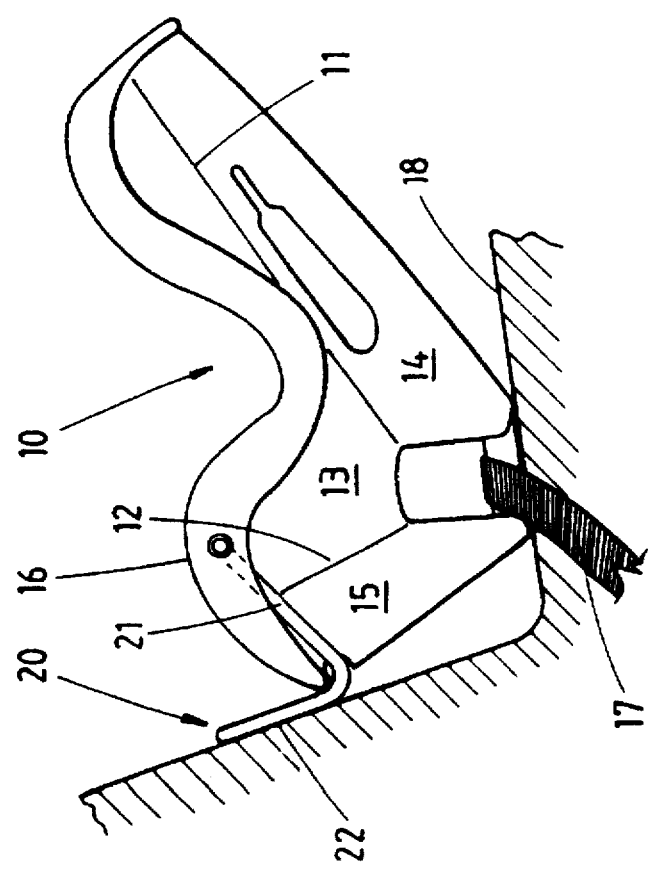

CHILD SAFETY SEAT WITH AN ANTI-REBOUND SUPPORT

This invention relates to a child safety seat with an anti-rebound support, and in particular to a means whereby the safety seat can be provided with an anti-rebound support for use in a rear facing position, while also being retractable or stowable so that it does not interfere with use either in the forward facing position or when being used as a cradle when not in a motor vehicle.

BACKGROUND OF THE INVENTION

Child safety seats for motor vehicles are well known, some of which are designed for use in two modes of operation. The first mode is for infants from birth to approximately six months of age where the safety seat is rearward facing. In this arrangement, an infants back is positioned in the direction of travel so that during collision, impact forces are absorbed through the back rest of the child safety seat.

The other mode of operation is where the seat is positioned so that the child is facing forward in the direction of travel. Both styles of safety seats are well known.

Another requirement for some safety seats is to be used as a rear facing safety seat when in a car, and as a cradle when not in a car.

It has also become common for a single child safety seat to be designed for both rearward and forward facing operation.

In all three applications, the safety seat is provided with at least one base member for supporting the seat in the various positions of use. For example, in the case of a safety seat used in both rear and forward facing positions, two base members are provided so that the safety seat may be reclined in the rear facing position, and more upright in the forward facing position. Obviously, the two base members are positioned at different angles on the safety seat. In the case of a rear facing seat that is also used as a cradle, then only one base member surface is required.

One potential problem for a safety seat, particularly when used in the rearward facing mode, is the possibility of rebound after a collision. As a result of either a rear impact, or following a front end collision, a rearward facing seat is inclined to rotate quickly towards the back rest of the vehicle seat. There is great danger of injury to an infant within the seat or the possibility of the infant being thrown with force against the vehicle seat back rest.

In order to prevent such rebound, a support which extends above the seat portion is used.

However, such supports are not convenient for dual purpose seats, or in the case of a rear facing seat that is also used as a cradle. In both cases, the anti-rebound support cannot be left in its in-use position.

Accordingly, there is a need to provide a means whereby an anti-rebound support can be positioned when needed in respect of a rearward facing seat, but can be conveniently and easily repositioned when the seat is to be used either in a forward facing direction or as a cradle.

Therefore, it is an object of this invention to provide such a means, and to do so in the simplest and easiest possible manner.

SUMMARY OF THE INVENTION

In its broadest form, the invention is a child safety seat for use on a vehicle seat having rebound protection comprising a seat and back rest portion for seating an infant, at least one base member on said safety seat that supports it when placed on a surface such as said vehicle seat, and an anti-rebound support attached to said safety seat so that, when said safety seat is used in a rearward facing direction on a vehicle seat, said anti-rebound support is moved to a first position where it extends above the seat portion of said child safety seat and abuts against the backrest of said vehicle seat to thereby restrain rebound, said anti-rebound support being moveable to a second position where it is stowed beneath said seat portion so that it is clear of said base member and any surface that said base member is resting on.

It is a requirement of the invention that the anti-rebound support be stowed or retracted under the safety seat to the extent that it is not located between the base member and the surface on which it rests, and that it does not prevent the base member from properly locating on any surface upon which it is placed.

Preferably, the anti-rebound support may be pivotally attached to the safety seat, but it may also be located within a slot which enables either rotation and sliding movement, or simply sliding movement, of the anti-rebound support.

Preferably, the anti-rebound support comprises a U-shaped tubular metal component, the ends of which are pivotally attached to a portion of the child safety seat. However, the anti-rebound support may comprise also a plate-like element also pivotally attached to the child safety seat. In the case of a U-shaped tubular metal component, the pivotal attachment may be on portions of the child safety seat that form a frame member below the seat portion, or side gusset portions extending between the seat and back rest portions. The U-shaped tubular metal member may be extended vertically above the seat portion to provide the anti-rebound facility, and will also conveniently locate beneath the seat portion so that it is fully recessed within the base of the child safety seat when used in either the forward facing direction or as a cradle.

When moved into the first position where the anti-rebound support extends above the seat portion, its rotation may be limited by stops or abutment surfaces formed on the base of the seat portion of the safety seat. In this way, the anti-rebound support is held between the back rest of the vehicle seat, and the abutment surfaces of the base of the child safety seat.

BRIEF DESCRIPTION OF THE DRAWINGS

In order for the invention to be fully understood, preferred embodiments will now be described. However, it should be realised that the invention is not to be limited or confined to the details of each of these embodiments.

The embodiments are illustrated in the accompanying representations in which:

FIG. 1 and 1a show a child safety seat in both rearward and forward facing positions respectively.

FIG. 3 and 3a show a child safety seat in both rearward and forward facing positions respectively.

FIG. 4 and 4a show a child safety seat in both rearward and forward facing positions respectively.

DETAILED DESCRIPTION OF THE INVENTION

Figure 2A:
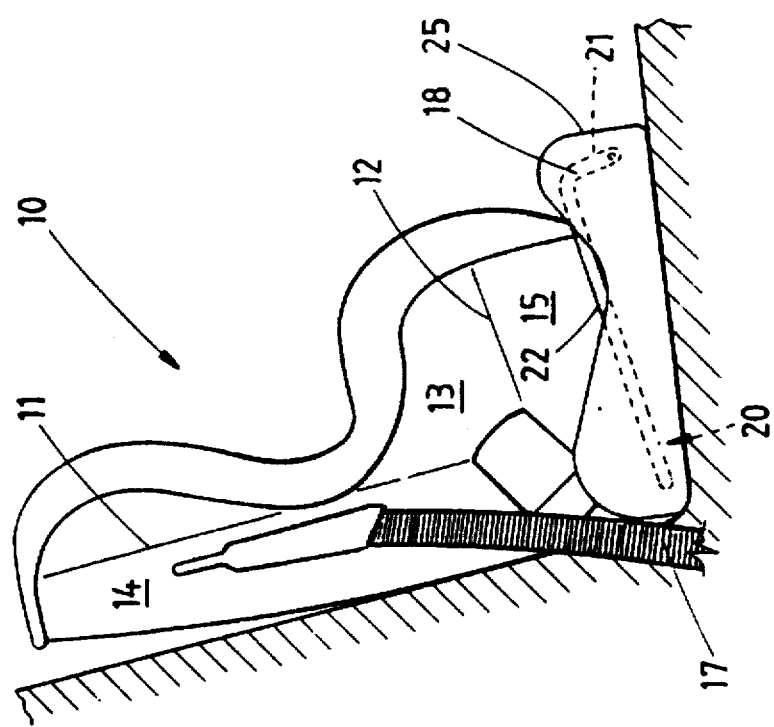
FIG. 2 and 2a show a child safety seat in both rearward and forward facing positions respectively.

In all of the embodiments shown in the accompanying illustrations, the child safety seat 10 comprises a back rest portion 11 and a seat portion 12. The safety seat 10 is manufactured from a unitary plastic moulding, in which the back rest and seat portions 11 and 12 are formed with side walls 13, a pair of back ribs 14 which extend along the back rest portion 11, and a pair of base ribs 15. The back and base ribs 14 and 15 are connected. The edges 16 of the side walls 13 are curved in cross section and extend along the length of the side wall 13 from the base rib 15 to the top of the back rib 14.

The safety seat 10 is provided with various apertures for fixing vehicle seat belts 17 to enable the safety seat 10 to be secured to a vehicle seat 18.

The safety seat 10 in these embodiments has a pair of base members 19 and 19a. In the rear facing position, as shown in FIG. 1, the base member 19, which is formed by the junction between the back and base ribs 14 and 15, rests on the vehicle seat 18.

In the forward facing position, shown in FIG. 1a, base member 19a, which is formed by the base ribs 15, rests on the vehicle seat 18. In the case of a safety seat 10 used only in a rear facing position, only one base member 19 would be needed. In this case, base member 19 would support the safety seat on any other surface upon which it may be placed.

In this embodiment, the anti-rebound support comprises a generally U-shaped bar 20 having a pair of side arms 22 and ends 21. The ends 21 are formed at 90° to the side arms 22 and are pivotally attached to the base ribs 15. The pair of ends 21 on either side of the U-shaped frame 20 pivotally locate to the outside surface of each of the base ribs 15.

In FIG. 1, the U-shaped bar 20 is in its first position where it extends above the end of the base ribs 15 and is positioned against the back rest portion of the vehicle seat 18. This provides support to restrain anti-clockwise rotation of the child safety seat 10. In the position shown in FIG. 1, the U-shaped bar 20 is restrained from further clockwise rotation by abutting against the safety seat 10. It is of course prevented from anti-clockwise rotation by being located against the back rest portion of the vehicle seat 18.

As seen in FIG. 1a, the U-shaped bar 20 can be rotated to a second position where it locates beneath the seat when the child safety seat 10 is used in a forward facing position. A recess 23 is provided in each of the base ribs 15 within which the U-shaped bar 20 locates so that it is not between the base ribs 15 and the seat portion of the vehicle seat 18 as shown in FIG. 1a.

Figure 2:
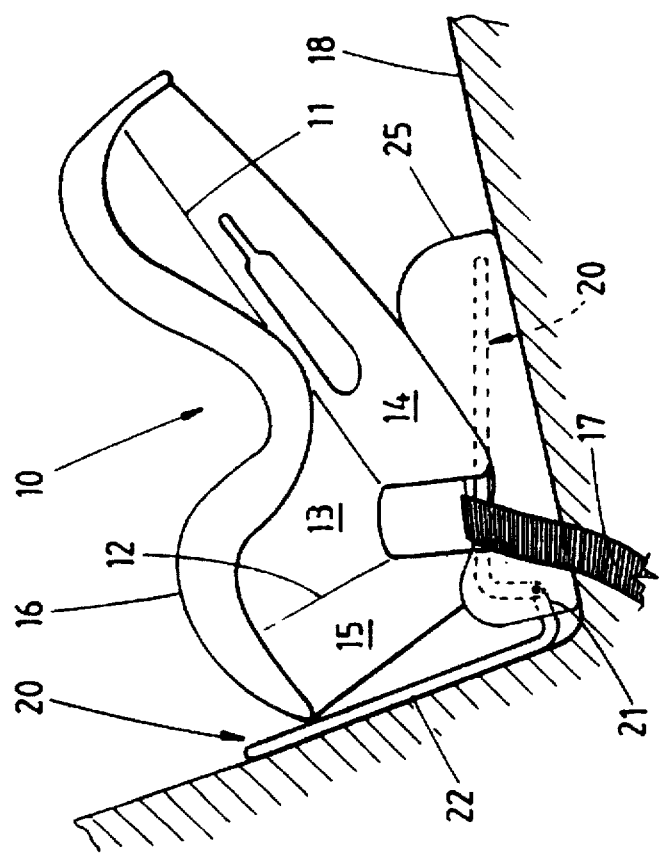

The embodiment shown in FIGS. 2 and 2a incorporates a base support 25 to which the safety seat 10 is attached. The safety seat 10 is able to move with respect to the base support 25 to adopt a different position with respect to the base support 25 for both the rearward and forward facing positions. In this embodiment, the U-shaped bar 20 is pivotally attached to the base support 25, and is arranged to rotate underneath and within the base support 25 when used in a forward facing position as shown in FIG. 2a.

The embodiment shown in FIGS. 3 and 3a is very similar to the arrangement shown in FIGS. 1 and 1a. However, in this embodiment, a slot 27 is formed in each of the base ribs 15. The ends 21 of the U-shaped bar 20 are designed to slide along the slot so that the U-shaped bar 20 is either extended as shown in FIG. 3, or is retracted at the other end of the slot and located beneath the base of safety seat 10 as shown in FIG. 3a. Recesses 23 are provided within the base ribs 15 within which to locate the U-shaped bar 20 when in the retracted position as shown in FIG. 3a.

Finally, a fourth embodiment is shown in FIGS. 4 and 4a. In this embodiment, the ends 21 are more elongate, and are pivotally attached to the side walls 13. Minimal pivotal movement is required for locating the U-shaped bar 20 beneath the safety seat 10, and as shown in FIG. 4a, recesses 23 are provided in the base ribs 15 for location therein of the U-shaped bar 20.

As will be seen from each of the above descriptions, the invention provides a very simple means of providing an anti-rebound support which can be used on a child safety seat that is designed for both forward and rearward facing operation.

I claim:

1. A child safety seat, having rebound protection, for use on a vehicle seat, said child safety seat comprising:

a safety seat portion;

a safety seat back rest portion extending from a rear edge of said safety seat portion;

at least one base surface that supports said safety seat when placed on a generally horizontal surface;

an anti-rebound support; and coupling means coupling said anti-rebound support to said safety seat so that said anti-rebound support is movable between a first position where said anti-rebound support extends past an edge of the safety seat portion opposite to said rear edge, when said child safety seat is in a rearward facing position, and a second position where said anti-rebound support is stowed beneath said seat portion so that said anti-rebound support is clear of said base surface and any surface that said base surface rests upon, when said safety seat is supported by said base surface, to facilitate use of said child safety seat in a forward facing position.

2. A child safety seat, having rebound protection, in combination with a vehicle seat having a horizontal portion and a vertical portion, said child safety seat comprising:

a safety seat portion;

a safety seat back rest portion extending from a rear edge of said safety seat portion;

at least one safety seat base surface for supporting said safety seat on said vehicle seat;

an anti-rebound support; and a coupling device coupling said anti-rebound support to said safety seat so that said anti-rebound support is movable between a first position where said anti-rebound support extends from an edge of the safety seat portion, opposite to said rear edge, and abuts against said vertical portion of said vehicle seat, when said child safety seat is in a rearward facing position, thereby to restrain rebound, and a second stowed position which is clear of said vehicle seat when said child safety seat is in a forward facing position, whereby said safety seat is supported on said vehicle seat primarily by said at least one safety seat base surface.

3. A child safety seat according to claim 2 wherein said anti-rebound support comprises a portion that is substantially the same width as the seat portion of said child safety seat.

4. A child safety seat according to claim 3 wherein said anti-rebound support is pivotally attached to said child safety seat so that said anti-rebound support rotates between said first and second positions.

5. A child safety seat according to claim 3 wherein said anti-rebound support comprises a U-shaped bar having a pair of side arms that are attached to a respective side of said safety seat portion with a cross bar extending between said pair of side arms.

6. A child safety seat according to claim 2 wherein said anti-rebound support is pivotally attached to said child safety seat so that said anti-rebound support rotates between said first and second positions.

7. A child safety seat according to claim 6 wherein said anti-rebound support comprises a U-shaped bar having a pair of side arms that are attached to a respective side of said safety seat portion with a cross bar extending between said pair of side arms.

8. A child safety seat according to claim 2 wherein said anti-rebound support comprises a U-shaped bar having a pair of side arms that are attached to a respective side of said safety seat portion with a cross bar extending between said pair of side arms.

9. A child safety seat according to claim 8 wherein said child safety seat further comprises two slots, one on each side of said child safety seat, to which said anti-rebound bar is attached that allows for both sliding and, rotation of said-rebound bar with respect to said slots.

10. A child safety seat in combination with a vehicle seat according to claim 2 wherein said anti-rebound support is held in said first position by being positioned between an edge of said seat portion and a backrest of said vehicle seat.

11. A child safety seat in combination with a vehicle seat according to claim 2, wherein said anti-rebound support comprises a portion that is substantially the same width as the seat portion of said child safety seat.

12. A child safety seat in combination with a vehicle seat according to claim 2, wherein said anti-rebound support is pivotally attached to said safety seat so that said anti-rebound support is rotatable between said first and second positions.

13. A child safety seat in combination with a vehicle seat according to claim 2, wherein said anti-rebound support comprises a U-shaped bar having a pair of side arms that are attached to a respective side of said safety seat portion with a cross bar extending between said pair of side arms.

14. A child safety seat in combination with a vehicle seat according to claim 13, wherein said safety seat further comprises two slots, one on each side of said safety seat, to which said anti-rebound support is attached to allow both sliding and rotation of said anti-rebound support with respect to said slots.

15. A child safety seat with rebound protection for use on a vehicle seat, said child safety seat comprising:

a safety seat portion;

a safety seat back rest portion extending from a rear edge of said safety seat portion;

at least one base surface for supporting said safety seat when said safety seat is placed on a desired support surface;

a safety seat anti-rebound support; and a coupling mechanism coupling said anti-rebound support to said safety seat so that said anti-rebound support is movable between a first position where said anti-rebound support extends from an edge of the safety seat portion opposite to said rear edge for engaging an adjacent vertical seat surface and restraining rebound of said child safety seat, when said child safety seat is in a rearward facing position, and a second position where said anti-rebound support is stowed beneath said seat portion such that said anti-rebound support is clear of said base surface, and any surface that said base surface is resting on, to facilitate use of said child safety seat in a forward facing position.

* * * * *